UNITED STATES PATENT OFFICE.

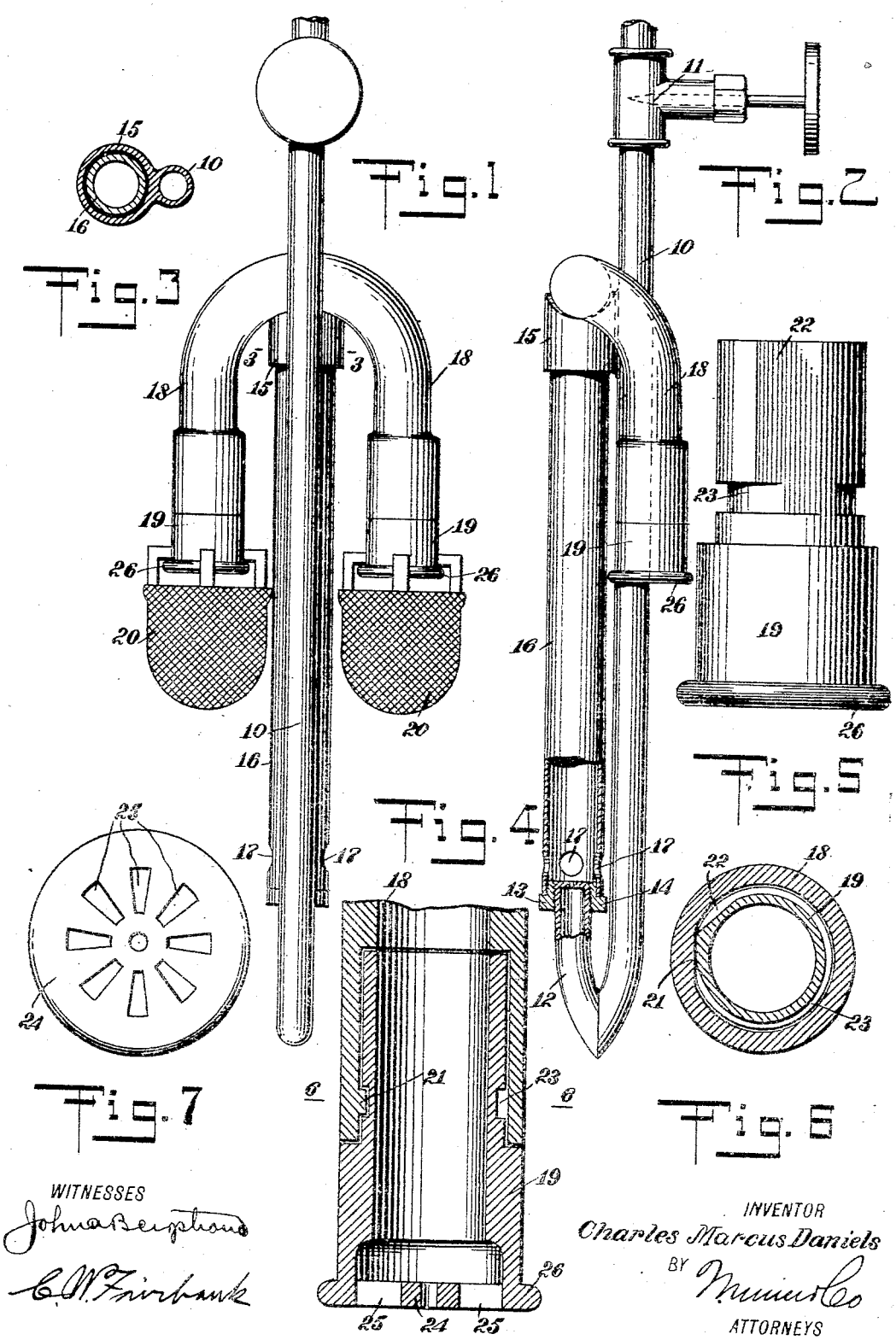

CHARLES MARCUS DANIELS, OF PARIS, ILLINOIS.

LAMP.

944,775.  Specification of Letters Patent.  Patented Dec. 28, 1909.

Application filed June 9, 1909. Serial No. 501,019.

*To all whom it may concern:*

Be it known that I, CHARLES MARCUS DANIELS, a citizen of the United States, and a resident of Paris, in the county of Edgar and State of Illinois, have invented a new and Improved Lamp, of which the following is a full, clear, and exact description.

This invention relates to certain improvements in incandescent lamps of that type in which the fluid fuel is heated and mixed with air before being delivered to the mantle.

The invention involves certain improvements in the form of the burner vaporizing tube and mixing tube, whereby a steadier light is obtained.

In my improved lamp, I support the mixing tube and burner directly from the fuel supply pipe or vaporizing chamber in such a way that the mixing tube and burner may be very readily removed. The burner itself is removable from the mixing tube, the construction of the burner and the means for supporting it, constituting another feature of my invention.

Reference is to be had to the accompanying drawings, forming a part of this specification, in which similar characters of reference indicate corresponding parts in all the figures, and in which—

Figure 1 is a rear elevation of a device constructed in accordance with my invention; Fig. 2 is a side elevation thereof; Fig. 3 is a transverse section on the line 3—3 of Fig. 1; Fig. 4 is a longitudinal section through the burner tube and support, and upon a somewhat larger scale; Fig. 5 is a side elevation of the burner tube removed from its support; Fig. 6 is a transverse section on the line 6—6 of Fig. 4; and Fig. 7 is an inverted plan view of the burner tube.

In the specific form of burner illustrated in the accompanying drawing, I provide a vapor-generating tube or supply tube 10, disposed substantially vertically and supported in any suitable manner at the upper end, said upper end being adapted to be secured to any suitable source of fuel supply. Adjacent the upper end of said tube, I preferably employ a needle valve 11 for controlling the supply of fuel to the burner proper. The lower end portion 12 of the generating tube extends upwardly closely adjacent the body of the tube, and at the upper end of this portion is a tip 13. This tip is threaded or otherwise secured to the end portion 12, and is provided with an annular flange 14 for engaging with the end of the mixing tube hereinafter referred to. The tip 13 is provided with a very smooth aperture therethrough concentric with the end of the generating tube and through this small aperture passes the fuel to be burned.

Adjacent the upper end of the generating tube 10, I provide a collar 15, rigidly secured to said tube and serving as a bracket for supporting the mixing tube. A mixing tube 16 extends down through this collar or bracket and at its lower end receives the upper end of the tip 13 and rests upon the flange 14 of said tip. The mixing tube at a slight elevation above its lower end and above the tip, is provided with a plurality of air-inlet ports 17, through which the air may enter and become mixed with the fuel. The air and fuel together pass upwardly through the mixing tube to the upper end thereof and thence downwardly through two or more branch tubes 18 connected to the mixing tube 16 above the bracket 15. These branches extend downwardly and at their lower ends are provided with removable burner tubes 19, which latter support the mantles 20. Each burner tube 19 extends up into the open end of the branch tube 18, and is so secured therein that it may readily be removed.

Within each branch tube 18 and above the lower end thereof I provide a lug or projection 21, and the corresponding burner tubes are provided with grooves or flattened portions 22 which receive said lugs when the burner tubes are extended upwardly to the ends of the branch tubes. Upon the peripheral surface of each burner tube is a circumferential groove 23, extending from the longitudinal groove 22 nearly but not quite, entirely around the burner tube. The circumferential groove is so disposed that when the burner tube is inserted to its limiting extent, it may then be rotated, so that the lug or projection 21 will travel along the circumferential groove to the end thereof. At the end of the groove it gradually grows shallower, so that when the burner tube is turned to the limiting extent, it will become wedged in place. At its lower end, each burner tube is provided with a burner plate 24, having a plurality of radially-disposed slots 25 through which the mixture may escape. Each burner tube is also preferably provided with a circumferential flange or other suitable means, whereby the mantle may be readily secured in place.

As the burners are closely adjacent the mixing tube, it is evident that the latter will become heated to very materially raise the temperature of the mixture before it reaches the burners. As the air is taken into the mixing tube at a point below the point at which the mixing tube is heated, it is evident that any pulsations due to the varying rate of delivery of the fuel, will be largely overcome by the expansion in the mixing and heating tube. The burner tubes, should they become slightly loosened, will not fall off, still they may be very readily removed by rotating them through nearly one revolution. The gauze plates ordinarily employed are done away with, and the burner plates shown are substantially indispensable. The form of openings in these plates diffuses the gas in such a way that it is spread uniformly over the mantle to give an even illumination, instead of rushing directly toward the lower end of the mantle, as is the case when a gauze plate is employed. The mantles are adjacent to and substantially upon opposite sides of the mixing tube, so that the latter is thoroughly and uniformly heated.

Having thus described my invention, I claim as new and desire to secure by Letters Patent:

1. In combination, a depending vaporizing tube having the lower end thereof extending upwardly, a bracket carried by said vaporizing tube intermediate its ends, a mixing tube supported by said bracket and having its lower end concentric with the upturned lower end of the vaporizing tube, and provided with openings for the admission of air adjacent said upturned end, and a burner carried by said mixing tube.

2. In combination, a depending vaporizing tube having the lower end thereof extending upwardly, a ring carried by said vaporizing tube intermediate its ends and constituting a bracket, a mixing tube extending down through said ring and supported thereby and having its lower end concentric with the upturned lower end of the vaporizing tube and provided with apertures for the admission of air adjacent said upturned end, and a depending burner connected to said mixing tube above the bracket on the latter.

3. In combination, a depending vaporizing tube having an upturned lower end, a mixing tube supported solely by said vaporizing tube intermediate the ends of the latter and having its lower end terminating adjacent the upturned lower end of the vaporizing tube to receive gas from the latter, and burners supported solely by said mixing tube.

4. In combination, a depending supply tube having an upturned lower end, a mixing tube suspended from said supply tube adjacent the upper end of the latter and hanging substantially parallel to said supply tube and having its lower end receiving air from the atmosphere and gas from the supply tube, branches depending from the upper end of the mixing tube and supported solely thereby, and burners at the lower ends of said branches.

In testimony whereof I have signed my name to this specification in the presence of two subscribing witnesses.

CHARLES MARCUS DANIELS.

Witnesses:
 JAS. E. TANNER,
 C. F. SHIRLEY.